Dec. 28, 1937.  J. D. TYSON  2,103,834
WHEEL
Filed Nov. 29, 1933
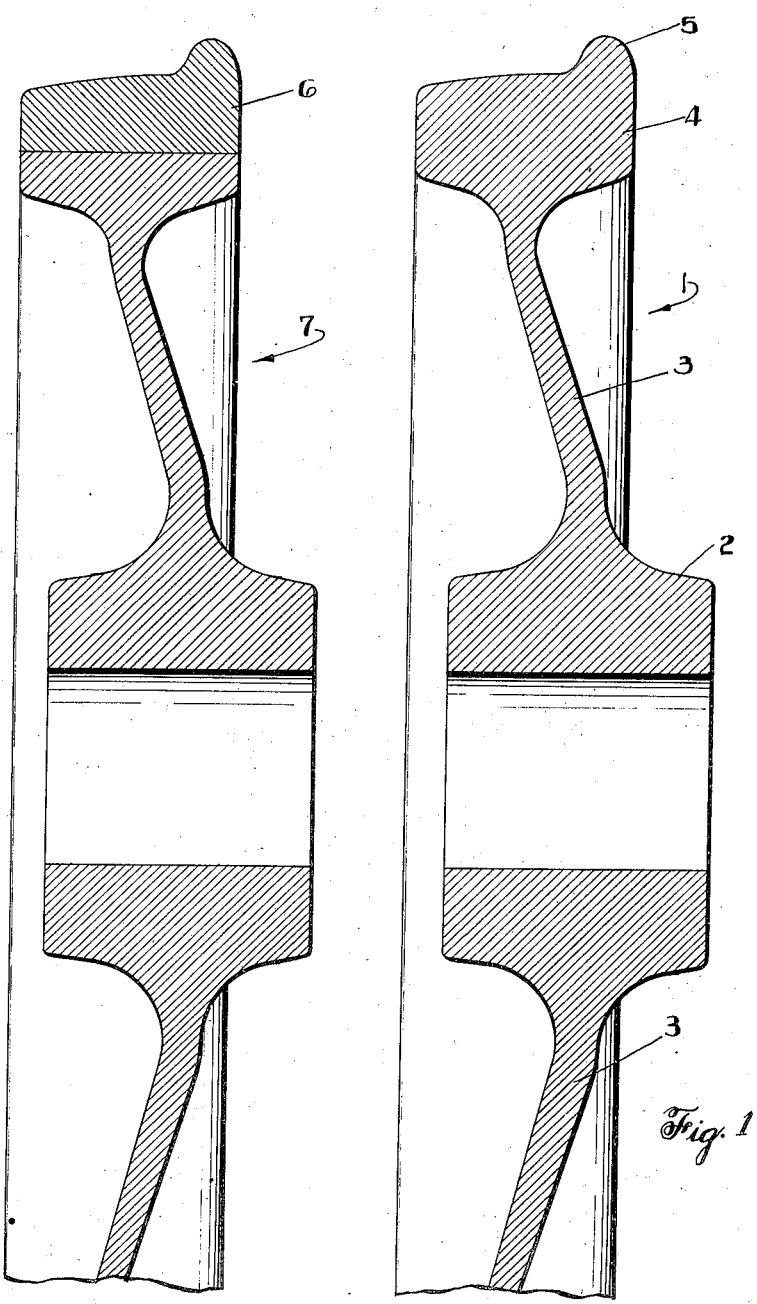

Patented Dec. 28, 1937

2,103,834

UNITED STATES PATENT OFFICE 2,103,834

WHEEL

John D. Tyson, Derry Township, Mifflin County, Pa.

Application November 29, 1933, Serial No. 700,272

6 Claims. (Cl. 295—30)

This invention relates generally to steel wheels for railway service and more particularly to a railway wheel of improved composition that is found to be especially adapted for resisting thermal cracks while at the same time insuring good mileage.

Thermal cracks appear in steel wheels, particularly wrought steel wheels, in the nature of checks or cracks in the tread or flange usually at right angles to the plane of the wheel and are apparently brought about by the heating of the tread during braking and its subsequent cooling. At one time it was generally believed that this condition was caused by imperfect brake equipment or brake adjustment, but it has been found that thermal cracks appear even with perfect braking equipment. Prior to my invention these cracks were a source of large concern to the railroads and careful inspection had to be made at frequent intervals to detect incipient thermal cracks because if continued in service the cracks will develop down through the rim into the plate, eventually causing a wheel failure. Heretofore these thermal cracks have not been considered as a wheelmaker's defect, but were considered purely as mechanical defects in the braking equipment beyond the control of the wheel manufacturer. Nevertheless wheel manufacturers long realized the importance of producing a steel wheel that would be resistant to the formation of these thermal or heat cracks with the result that a great many attempts have heretofore been made to develop a wheel that would stand up under the conditions that tend to produce thermal cracks. Such attempts have included the use of special or alloy steels, as well as heat treatment of wheels of different compositions but none has met with the necessary degree of success.

It is the object of my invention to provide an improved wheel for overcoming or resisting thermal cracks while at the same time insuring good mileage together with maximum strength and safety of the wheel. I have discovered what I believe from actual tests to be a complete solution to this problem simply by using a plain carbon steel of only medium carbon content heat treated so as to produce a metallographic structure which is effective in coping with thermal cracking. This has been found most effective in resisting or preventing thermal cracks without any sacrifice in mileage over that normally required in wheels of standard specifications which required a relatively high carbon content in a plain carbon steel. Such a high carbon steel whether quenched hardened or unhardened is unable to resist thermal cracks. Hence the simplicity of my solution to this very annoying problem avoids the necessity of expensive alloy wheels and shows that special braking equipment will not have to be developed and that special attention will not have to be given to the ordinary braking equipment in order to minimize the possibility of thermal cracking.

It will, of course, be understood that the wheel may be of any suitable type or construction adapted for cars, locomotives or tenders, but merely as illustrative of certain forms of wheels, among a great many others, I have shown in Figs. 1 and 2 fragmentary diametrical sections of two forms of wheels. If desired, the wheel may be of the solid form generally indicated at 1 in Fig. 1 having a hub 2, a plate 3 and a rim 4 provided with a flange 5. Also, the wheel, whether a locomotive driving wheel or truck wheel, may be provided with a tire 6 in which case the wheel body generally indicated at 7 may be made of any desired material while the tire 6 is formed of my improved hardened composition. The term rim is used hereinafter to define broadly both the tire 6 or rim 4. The wheel is preferably wrought steel although the principles of the invention herein disclosed may be applicable to cast steel wheels.

Before considering specifically the composition of my improved wheel and the method of heat treating the same, it will be first understood that the recommended or standard American Railway Association specifications for wrought carbon steel wheels has substantially the following chemical composition; carbon 0.65% to 0.85%, manganese 0.60% to 0.85%, silicon not less than 0.15%, phosphorous not over 0.05%, sulphur not over 0.05%. This composition is ordinarily known as plain carbon steel and its carbon content is considered herein to classify the steel as a high carbon steel. In the disclosure of this invention a low carbon steel is considered to have a carbon content up to 0.25%, a medium carbon steel from 0.25% to 0.55%, and a high carbon steel from 0.55% to 1.00%. In any one of these compositions the remaining constituents are substantially the same as in the standard specifications above mentioned, although it will, of course, be understood that the specific percentages thereof may vary within reasonable limits so long as the general characteristics are retained. Also it will be understood that other deoxidizers such as aluminum may be employed instead of silicon, and certain other portions of other or additional elements may be used while still retaining the principle of the invention herein disclosed. While generally it is within the theory of my invention to use a plain carbon steel of medium carbon content as above set forth, yet in one specific instance I have employed a carbon content of 0.40% to 0.45%, as this has been found to give most excellent results in actual practice.

After a wheel of my improved composition is forged or otherwise suitably worked to the desired shape, it is then heated above its recalescence point, for example, 1400° F. and held at that temperature for a sufficient length of time to allow formation of a true solid solution of the carbon in the iron. The length of this time depends upon the size of the various sections of the wheel, although for a standard 36" wheel of American Railway Association design it is found that approximately five hours are sufficient. The wheel is then quenched in a liquid medium such as oil, water, salt solution or other suitable liquid, this quenching preferably being drastic. After the quenching operation the wheel is tempered at a low enough temperature that the hardness of the wheel will not be greatly affected. It will, of course, be understood that either the whole wheel may be quenched or only the rim thereof. The foregoing quenching and tempering steps are well known in the art and may be practiced with any suitable equipment that is available. It is preferable that the quench be as drastic as possible to permit the lowest possible carbon content consistent with the principles and results herein disclosed. As a result of the foregoing method the predominating microstructural constituents are troostite and sorbite, the troostite being in a substantially larger amount than sorbite.

Wheels of my improved composition when placed in actual use have not developed any thermal cracks and have given excellent mileage. While various theories might be advanced to explain why a wheel of my improved composition will produce these results whereas wheels of other compositions have failed under similar operating conditions, yet the following is briefly my theory. The severe application of braking pressure creates a temperature at the surface of the tread in excess of its upper critical or recalescence point which is approximately 1375° F., that is, assuming that the wheel is of the standard composition as hereinbefore set forth. After the train is stopped and the braking action is discontinued, the thin skin on the tread which has been heated to above this temperature is rapidly cooled by conduction through the remaining colder portion of the wheel, by conduction through the rail, and by convection to the atmosphere. This cooling is believed to be so rapid that it is the equivalent of a quenching in a liquid medium thereby forming, only in the thin skin of the tread, the very hard metallographic constituents, sorbite, troostite and sometimes martensite. This local change of structure is believed to set up very severe stresses in the tread skin. Steel of the composition used for regular wrought steel wheels will possibly average about 0.75% carbon and when placed in troostite form is very hard and brittle and has practically no ductility or ability to resist deformation without cracking. As a consequence it is unable to withstand any severe stresses set up by a local change of structure such as in the wheel tread and accordingly it ruptures. The ruptures that occur in this surface or skin layer have come to be known as thermal cracks. Assuming that this theory is correct, I continue on the theory that if the wheel before being placed in use has a metallographic structure formed largely of troostite, then when the wheel is braked heavily in service so that a layer of the tread surface is heated to above its critical temperature and this layer is subsequently cooled very rapidly in the surrounding air, a troostitic structure would again be formed. With the normal structure of the wheel composed of the same metallographic constituents as this layer at the surface, it is believed that no stresses are set up because there is no local change of structure. Also, troostitic structure in medium carbon steel is very much more ductile than troostitic structure in high carbon steel and it is believed that the combination of these factors is what gives my improved wheel the ability to resist completely thermal crack formation. My theory of this aspect of the invention is that as the braking operation heats up the layer at the surface of the tread to above its critical temperature, a change takes place in the normal troostitic structure, resulting in stresses which, however, are not destructive because of the ductile quality of the medium steel. After the braking action ceases and the tread cools from above its recalescence point, the surface layer is again hardened and the stresses relieved without the possibility of stresses being set up by a local change in the metallographic structure because the cooled wheel will have a substantially uniform structure. As a result, my improved wheel is adapted to resist temporary stresses during an increasing temperature and to resist a permanent change in structure and stresses during cooling. Hence it is believed that because of the foregoing reasons cracks and ruptures do not appear in the tread.

To obtain the foregoing troostitic structure the wheel or rim is drastically quenched but this offers some difficulties because the shape of the wheel has wide variations in the size of its sections. Such a wheel has always been considered a hazardous product for even mild quenching, but it was found that a relatively medium carbon steel as above set forth could be drastically quenched without danger of cracking or of setting up excessive internal stresses while at the same time obtaining the desired metallographic structure. It was believed that the higher ductility of the medium carbon steel would prevent its rupture during quenching and it is found that such wheels have not only a tensile strength and hardness comparable with the usual wrought steel wheels but that they have nearly twice as much ductility and that microscopic examination discloses a troostitic structure in the rim that is believed to be most desirable for maximum thermal crack resistance.

As a result of extensive tests and actual trials, my improved wheels have been found to resist most effectively thermal cracks while at the same time giving good mileage. It will, of course, be understood that in accordance with the disclosure herein and the principles outlined, certain variations in the percentage composition and other factors may be employed without departing from the spirit of the invention as set forth in the appended claims.

I claim:

1. A railway wheel having a medium carbon plain carbon steel rim normally of troostitic structure in the tread whereby the generation of heat during braking action and subsequent cooling allows substantially the same metallographic structure to be maintained.

2. A railway wheel rim of wrought steel normally having a troostitic structure formed by heating the rim above its recalescence point, quenching the same and then tempering the wheel.

3. A railway wheel rim of wrought steel of medium carbon content normally having a troostitic structure formed by heating the rim above its recalescence point and then quenching the same.

4. A plain carbon steel railway wheel rim of medium carbon content normally having a troostitic and sorbitic structure formed by heating the wheel rim above its recalescence point and then quenching the same, whereby the generation of heat during braking action and subsequent cooling allows substantially the same metallographic structure to be maintained.

5. A railway wheel rim of plain carbon steel having a medium carbon content and in which troostite and sorbite are the predominating micro-structural constituents.

6. A railway wheel rim of plain carbon steel having a medium carbon content in which sorbite is a material micro-structural constituent.

JOHN D. TYSON.